(12) United States Patent
Iwano (10) Patent No.: US 12,444,295 B2
(45) Date of Patent: Oct. 14, 2025

(54) TWO-WIRE TRANSMITTER

(71) Applicant: Yokogawa Electric Corporation, Tokyo (JP)

(72) Inventor: Youichi Iwano, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 274 days.

(21) Appl. No.: 18/116,025

(22) Filed: Mar. 1, 2023

(65) Prior Publication Data

US 2023/0308017 A1 Sep. 28, 2023

(30) Foreign Application Priority Data

Mar. 24, 2022 (JP) ................................ 2022-048730

(51) Int. Cl.
| | |
|---|---|
| G08C 19/02 | (2006.01) |
| G01R 19/00 | (2006.01) |
| G08C 19/08 | (2006.01) |
| H04B 3/54 | (2006.01) |
| G08C 19/00 | (2006.01) |

(52) U.S. Cl.
CPC ......... *G08C 19/02* (2013.01); *G01R 19/0038* (2013.01); *G08C 19/08* (2013.01); *H04B 3/548* (2013.01); *G08C 19/00* (2013.01)

(58) Field of Classification Search
CPC ........ G08C 19/00; G08C 19/02; G08C 19/08; G01R 19/0038; H04B 3/548
See application file for complete search history.

(56) References Cited

U.S. PATENT DOCUMENTS

| | | | | |
|---|---|---|---|---|
| 8,718,152 | B2* | 5/2014 | Iwano | G08C 19/02 |
| | | | | 327/1 |
| 2014/0107856 | A1* | 4/2014 | Haynes | G01F 23/284 |
| | | | | 700/298 |
| 2015/0318694 | A1* | 11/2015 | Stevens | H04L 12/40189 |
| | | | | 307/52 |
| 2016/0088704 | A1* | 3/2016 | Lenk | H05B 45/44 |
| | | | | 315/185 R |

FOREIGN PATENT DOCUMENTS

JP  2012-99088 A  5/2012

OTHER PUBLICATIONS

Chinese Office Action dated Jun. 25, 2025 issued for Chinese patent application No. 202310302813.5 and its English machine translation.

* cited by examiner

*Primary Examiner* — Gary L Laxton
(74) *Attorney, Agent, or Firm* — RANKIN, HILL & CLARK LLP (57) ABSTRACT

There is provided a two-wire transmitter that is connected to an external circuit via two transmission lines and that operates by using an input voltage and a current signal supplied from the external circuit, the two-wire transmitter including: a constant current circuit that controls the current signal in accordance with a detection result from a sensor; and a shunt regulator circuit that controls a circuit voltage in accordance with the input voltage, in which the shunt regulator circuit controls the circuit voltage such that the circuit voltage increases as the input voltage increases.

4 Claims, 4 Drawing Sheets

TWO-WIRE TRANSMITTER

CROSS-REFERENCE TO RELATED APPLICATION(S)

The present application claims priority to and incorporates by reference the entire contents of Japanese Patent Application No. 2022-048730 filed in Japan on Mar. 24, 2022.

BACKGROUND OF THE INVENTION

Field of the Invention

The present invention relates to a two-wire transmitter.

Description of the Related Art

There is known a two-wire transmitter that is connected to an external circuit via two transmission lines and that operates by using an input voltage and a current signal supplied from the external circuit (e.g., see JP 2012-99088 A).

A circuit voltage of an internal circuit in a two-wire transmitter of JP 2012-99088 A is kept constant even when an input voltage fluctuates, so that the two-wire transmitter cannot effectively use power from an external circuit.

One aspect of the present invention provides a two-wire transmitter capable of effectively using the power from an external circuit.

SUMMARY OF THE INVENTION

According to one aspect of embodiments, a two-wire transmitter that is connected to an external circuit via two transmission lines and that operates by using an input voltage and a current signal supplied from the external circuit, includes: a constant current circuit that controls the current signal in accordance with a detection result from a sensor; and a shunt regulator circuit that controls a circuit voltage in accordance with the input voltage, wherein the shunt regulator circuit controls the circuit voltage such that the circuit voltage increases as the input voltage increases.

DETAILED DESCRIPTION OF THE PREFERRED EMBODIMENTS

An embodiment will be described below with reference to the drawings. The same elements are denoted by the same reference signs, and redundant description will be appropriately omitted.

Figure 1:
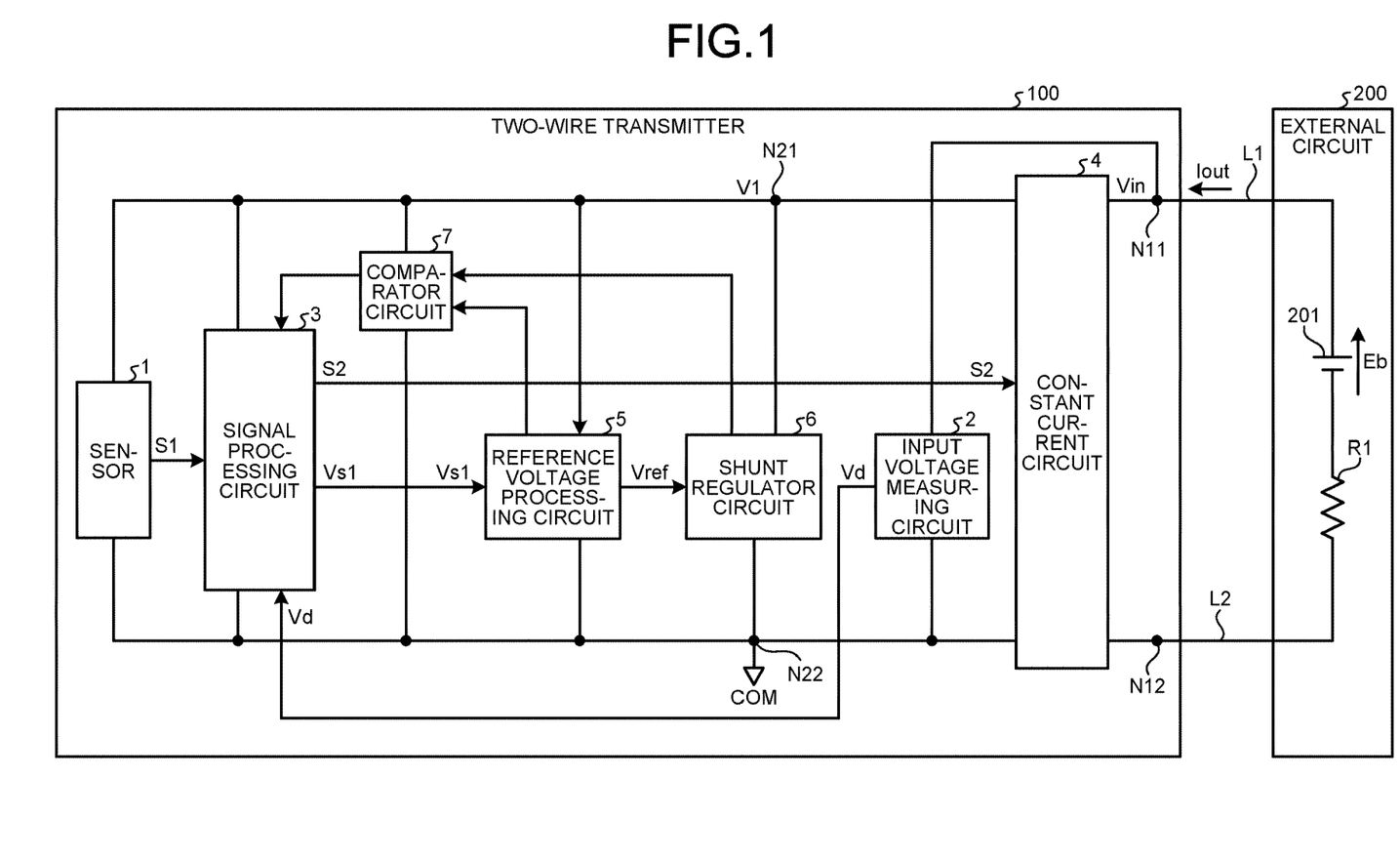
FIG. 1 illustrates an example of a schematic configuration of a two-wire transmitter according to an embodiment.

FIG. 1 illustrates an example of a schematic configuration of a two-wire transmitter according to the embodiment. A two-wire transmitter 100 is used by being connected to an external circuit 200.

The two-wire transmitter 100 is connected to the external circuit 200 via two transmission lines of a transmission line L1 and a transmission line L2. Connection portions of the transmission line L1 and the transmission line L2 in the two-wire transmitter 100 are referred to and illustrated as a node N11 and a node N12.

The two-wire transmitter 100 operates by using a voltage and a current supplied from the external circuit 200. The voltage supplied from the external circuit 200 to the two-wire transmitter 100 is referred to and illustrated as an input voltage Vin. The input voltage Vin is a voltage of the node N11 in a case where a node N22 to be described later is set as a reference. The current supplied from the external circuit 200 to the two-wire transmitter 100 is referred to and illustrated as a current signal Iout. The current signal Iout is a current flowing from the transmission line L1 toward the node N11. Although details will be described later, the current signal Iout is controlled by the two-wire transmitter 100.

The external circuit 200 includes a power supply 201 and a resistor R1. In this example, the power supply 201 is a voltage source having a power supply voltage Eb. The power supply 201 and the resistor R1 are connected in series between the transmission line L1 and the transmission line L2.

Note that connection may mean electrical connection within a range without contradiction. Furthermore, "being connected between elements" may include being electrically connected via another element within a range not hindering the functions of these elements.

When the current signal Iout flows through the resistor R1, a voltage is generated in the resistor R1. The magnitude of the current signal Iout controlled by the two-wire transmitter 100 is detected by detecting the voltage. Information is transmitted from the two-wire transmitter 100 to the external circuit 200 by using the current signal Iout in such a way.

The two-wire transmitter 100 includes a sensor 1, an input voltage measuring circuit 2, a signal processing circuit 3, a constant current circuit 4, a reference voltage processing circuit 5, a shunt regulator circuit 6, and a comparator circuit 7. Note that the sensor 1 may be provided outside the two-wire transmitter 100.

The sensor 1 detects a physical quantity. Examples of the physical quantity include pressure, temperature, and a flow rate. Examples of the sensor 1 include a pressure sensor, a temperature sensor, and a flow rate sensor. Examples of the two-wire transmitter 100 include a pressure transmitter, a temperature transmitter, and a flow rate transmitter. The sensor 1 generates and outputs a sensor signal S1 in accordance with a detection result. For example, as a detection value from the sensor 1 increases, the voltage of the sensor signal S1 increases.

The input voltage measuring circuit 2 measures a voltage corresponding to the input voltage Vin. In this example, the input voltage measuring circuit 2 is connected between the node N11 and the node N22 to be described later, and generates a voltage signal Vd corresponding to the input voltage Vin. The voltage signal Vd is sent from the input voltage measuring circuit 2 to the signal processing circuit 3, and input to the signal processing circuit 3.

The signal processing circuit 3 can execute various types of signal processing. In one example, the signal processing circuit 3 generates a current control signal S2 to be described later after executing processing such as linearity correction on the sensor signal S1 from the sensor 1. The signal processing circuit 3 may be an exclusively designed circuit, or may include a general-purpose microcontroller. In the example in FIG. 1, the signal processing circuit 3 generates various signals for controlling the constant current circuit 4, the reference voltage processing circuit 5, and the shunt regulator circuit 6.

Control on the constant current circuit 4 will be described. The signal processing circuit 3 generates the current control signal S2 for causing the constant current circuit 4 to control the current signal Iout based on the sensor signal S1 from the sensor 1. The current control signal S2 is sent from the signal processing circuit 3 to the constant current circuit 4, and input to the constant current circuit 4.

The constant current circuit 4 controls (the magnitude of) the current signal Iout in accordance with the current control signal S2 from the signal processing circuit 3, that is, in accordance with the sensor signal S1, more specifically, the detection result from the sensor 1. For example, the current signal Iout is controlled within a range of 4 to 20 mA. Control is performed such that the current signal Iout has 4 mA in a case where a detection value of the sensor 1 is 0% to a set span. Control is performed such that the current signal Iout has 20 mA in a case where the detection value of the sensor 1 is 100% to a set span. In other words, the signal processing circuit 3 generates the current control signal S2 such that the current signal Iout is controlled in such a way by the constant current circuit 4.

In the example in FIG. 1, the constant current circuit 4 is connected between the node N11 and the node N12 and the signal processing circuit 3, the reference voltage processing circuit 5, the shunt regulator circuit 6, and the comparator circuit 7. Nodes opposite to the node N11 and the node N12 across the constant current circuit 4 are referred to and illustrated as a node N21 and the node N22, respectively. The sensor 1, the signal processing circuit 3, the reference voltage processing circuit 5, the shunt regulator circuit 6, and the comparator circuit 7 are connected in parallel between the node N21 and the node N22.

Note that, the signal processing circuit 3, the constant current circuit 4, the reference voltage processing circuit 5, the shunt regulator circuit 6, the comparator circuit 7, and the like may be referred to as internal circuits below. The sensor 1 may also be one of the internal circuits.

The node N22 applies a common reference potential (COM) to an internal circuit. A voltage of the node N21 in a case where the node N22 is set as a reference is referred to and illustrated as a circuit voltage V1. The circuit voltage V1 applies an operating voltage of the internal circuit. The operating voltage of the internal circuit may be the circuit voltage V1 itself, or may be a voltage obtained by decreasing the circuit voltage V1 with a DC to DC (DCDC) converter or the like. Furthermore, a current corresponding to the current signal Iout flows from the constant current circuit 4 toward the node N21. That is, the internal circuit operates by using these voltages and currents. Note that, when the sensor 1 is provided outside the two-wire transmitter 100 and connected to the two-wire transmitter 100, a voltage and a current are supplied from the circuit voltage V1 to the external sensor 1.

Control on the reference voltage processing circuit 5 and the shunt regulator circuit 6 performed by the signal processing circuit 3 will be described. The signal processing circuit 3 generates a voltage control signal Vs1 for causing the reference voltage processing circuit 5 and the shunt regulator circuit 6 to control the circuit voltage V1 based on the voltage signal Vd from the input voltage measuring circuit 2. The voltage control signal Vs1 is sent from the signal processing circuit 3 to the reference voltage processing circuit 5, and input to the reference voltage processing circuit 5.

The reference voltage processing circuit 5 generates a reference voltage signal Vref based on the voltage control signal Vs1 from the signal processing circuit 3. The reference voltage signal Vref is sent from the reference voltage processing circuit 5 to the shunt regulator circuit 6, and input to the shunt regulator circuit 6.

The shunt regulator circuit 6 controls the circuit voltage V1 based on a voltage measured by the input voltage measuring circuit 2. In this example, the shunt regulator circuit 6 controls (the magnitude of) the circuit voltage V1 in accordance with the reference voltage signal Vref, that is, the voltage control signal Vs1, the voltage signal Vd, and more specifically (the magnitude of) the input voltage Vin. Specifically, the shunt regulator circuit 6 controls the circuit voltage V1 based on a result of comparison between the reference voltage signal Vref and the circuit voltage V1. The shunt regulator circuit 6 controls the circuit voltage V1 such that the circuit voltage V1 increases as the input voltage Vin increases. In other words, the reference voltage processing circuit 5 generates the reference voltage signal Vref and the signal processing circuit 3 generates the voltage control signal Vs1 such that the shunt regulator circuit 6 controls the circuit voltage V1.

The comparator circuit 7 is used for detecting an abnormality of the circuit voltage V1. Details will be described later with reference to FIG. 2.

In the two-wire transmitter 100 described above, the shunt regulator circuit 6 controls the circuit voltage V1 of the internal circuit such that the circuit voltage V1 increases as the input voltage Vin increases. As the circuit voltage V1 increases, power available to the internal circuit also increases accordingly. Therefore, power from the external circuit 200 can be effectively used.

In the two-wire transmitter of JP 2012-99088 A, the circuit voltage V1 is determined so that the operation of the internal circuit is established when the power supply 201 of the external circuit 200 has the minimum power supply voltage Eb. Even when the power supply voltage Eb and the input voltage Vin increase, the circuit voltage V1 has a constant value. Therefore, the power as a result of an increase of the input voltage Vin, more specifically, the power of the difference between the power based on the input voltage Vin and the power based on the circuit voltage V1 is only consumed as heat in a transistor (corresponding to transistor Q4 to be described later) in the constant current circuit 4, for example. Even when the input voltage Vin increases, the power available to the internal circuit does not increase. The two-wire transmitter 100 according to the embodiment addresses such a problem.

An example of a specific circuit configuration of the two-wire transmitter 100 will be described with reference to FIG. 2.

Figure 2:
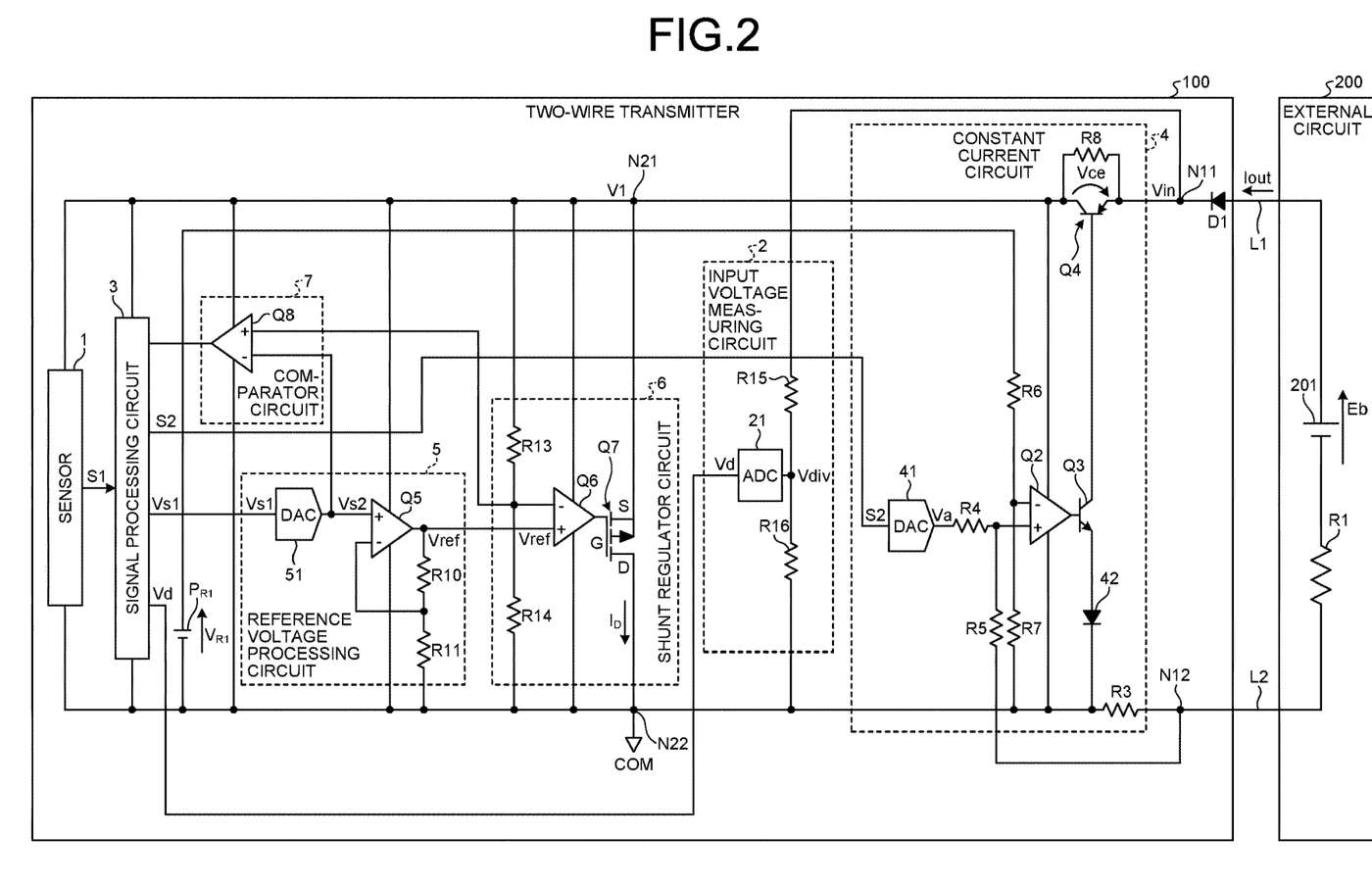
FIG. 2 illustrates an example of a circuit configuration of the two-wire transmitter.

FIG. 2 illustrates an example of the circuit configuration of the two-wire transmitter. The circuit configurations of the input voltage measuring circuit 2, the constant current circuit 4, the reference voltage processing circuit 5, and the shunt regulator circuit 6 are illustrated. Furthermore, the two-wire transmitter 100 includes a diode D1 and a reference voltage source $P_{R1}$. Note that the two-wire transmitter 100 can operate without the diode D1. Furthermore, the two-wire transmitter 100 can operate without the reference voltage source $P_{R1}$, in addition, a resistor R6, and a resistor R7 to be described later if an inverting terminal of an amplifier Q2 is connected to the reference potential (COM).

The diode D1 is a backflow prevention diode that is connected between the transmission line L1 and the node N11 to flow a current from the transmission line L1 toward the node N11. The reference voltage source $P_{R1}$ outputs a reference voltage $V_{R1}$. The reference voltage $V_{R1}$ is supplied from the reference voltage source $P_{R1}$ to the constant current circuit 4, divided by the resistor R6 and the resistor R7 to be described later, and input to the inverting terminal of the amplifier Q2.

The input voltage measuring circuit 2 includes a resistor R15, a resistor R16, and an analog to digital (AD) converter 21. The resistor R15 and the resistor R16 are used for measuring the divided input voltage Vin, and connected in series between the node N11 and the node N22. The input voltage Vin is divided by the resistor R15 and the resistor R16 to become a voltage Vdiv. The voltage Vdiv is input to the AD converter 21. The AD converter 21 converts the analog voltage Vdiv into a digital voltage signal Vd and outputs the digital voltage signal Vd. As described above, the voltage signal Vd is sent from the input voltage measuring circuit 2 to the signal processing circuit 3, and input to the signal processing circuit 3.

Inputting the voltage Vdiv to the AD converter 21 allows an input withstand voltage of the AD converter 21 to be smaller (lower) than that in a case where the input voltage Vin is directly input to the AD converter 21. When the input withstand voltage of the AD converter 21 is larger than the input voltage Vin, the input voltage Vin may be directly input to the AD converter 21. The division of the input voltage Vin is unnecessary, and the resistor R15 and the resistor R16 may be omitted.

Furthermore, the signal processing circuit 3 may include the function of the AD converter 21. In that case, the voltage Vdiv is directly input to the signal processing circuit 3, and the voltage signal Vd is obtained in the signal processing circuit 3. Conversion performed by the AD converter 21 is unnecessary, and the AD converter 21 may be omitted. When all of the resistor R15, the resistor R16, and the AD converter 21 are omitted, the input voltage measuring circuit 2 may be formed only of wiring connecting the node N11 and the signal processing circuit 3.

Although not illustrated in FIG. 2, a capacitor may be connected in parallel with the resistor R16. Noise and the like in the input voltage Vin can be reduced, and short-time fluctuation of a voltage input to the AD converter 21 can be inhibited.

The constant current circuit 4 includes a DA converter 41, resistors R3 to R8, the amplifier Q2, a transistor Q3, the transistor Q4, and a diode 42. Note that the diode 42 may be omitted, and that portion may be directly connected to the reference potential (COM).

The DA converter 41 converts the digital current control signal S2 from the signal processing circuit 3 into an analog voltage signal Va, and outputs the analog voltage signal Va. The resistor R4 is connected between the DA converter 41 and a non-inverting terminal of the amplifier Q2. The resistor R5 is connected between a connection point of the resistor R4 and the non-inverting terminal of the amplifier Q2 and the node N12. The resistor R3 is a feedback resistor to the amplifier Q2, which is connected between the resistor R5 and the resistor R7 on the side opposite to the amplifier Q2 across the resistor R5 and the resistor R7. The voltage signal Va output from the DA converter 41 is divided by the resistor R4, the resistor R5, and the resistor R3, and input to the non-inverting terminal of the amplifier Q2.

The resistor R6 is connected between the reference voltage source $P_{R1}$ and the inverting terminal of the amplifier Q2. The resistor R7 is connected between the inverting terminal of the amplifier Q2 and the node N22. The reference voltage $V_{R1}$ from the reference voltage source $P_{R1}$ is divided by the resistor R6 and the resistor R7, and input to the inverting terminal of the amplifier Q2.

The amplifier Q2 is an error amplifier that detects a difference (error) between a voltage obtained by dividing the voltage signal Va with the resistor R4, the resistor R5, and the resistor R3 and a voltage obtained by dividing the reference voltage $V_{R1}$ with the resistor R6 and the resistor R7. The amplifier Q2 controls a current flowing through the internal circuit together with the transistor Q3 and the transistor Q4 based on the error.

The transistor Q3 is an NPN bipolar transistor. A base of the transistor Q3 is connected to an output end of the amplifier Q2. A collector of the transistor Q3 is connected to a base of the transistor Q4. An emitter of the transistor Q3 is connected to the node N12 via the diode 42. The diode 42 is connected between the emitter of the transistor Q3 and the node N12 so that a current flows from the emitter of the transistor Q3 toward the node N12.

The transistor Q4 is a PNP bipolar transistor. The transistor Q4 is connected between the transmission line L1 and the shunt regulator circuit 6 such that a current between a collector and the emitter flows from the transmission line L1 toward the shunt regulator circuit 6. A base of the transistor Q4 is connected to the collector of the transistor Q3. The collector of the transistor Q4 is connected to the node N21. The emitter of the transistor Q4 is connected to the node N11. The voltage between the collector and the emitter of the transistor Q4 is referred to and illustrated as a voltage Vce. The circuit voltage V1 is smaller than the input voltage Vin by the voltage Vce.

The resistor R8 is connected between the collector and the emitter of the transistor Q4. The resistor R8 is an activation resistor for activating the internal circuit. The resistor R8 is connected in parallel to the transistor Q4.

The magnitude of the current signal Iout is controlled by controlling the magnitude of an emitter current of the transistor Q4. The magnitude of the emitter current of the transistor Q4 is controlled by a base current of the transistor Q4. The base current of the transistor Q4 is controlled by a collector current of the transistor Q3. The collector current of the transistor Q3 is controlled by a base current of the transistor Q3. The amplifier Q2 controls the base current of the transistor Q3. The voltage signal Va, that is, the current control signal S2, the sensor signal S1, and more specifically a voltage in accordance with a detection value of the sensor 1 are input to the non-inverting terminal of the amplifier Q2. For example, such circuit configuration causes the current signal Iout to be controlled in accordance with the detection value of the sensor 1.

The reference voltage processing circuit 5 includes a DA converter 51, an amplifier Q5, a resistor R10, and a resistor R11. As described above, the voltage control signal Vs1 from the signal processing circuit 3 is supplied to the reference voltage processing circuit 5. The voltage control signal Vs1 is a signal for causing the shunt regulator circuit 6 to control the circuit voltage V1 such that the voltage Vce of the transistor Q4 becomes a predetermined voltage at which the transistor Q4 is not saturated. The predetermined voltage may be a constant voltage (e.g., 2 V) or a non-constant voltage. The voltage control signal Vs1 may be restricted such that the circuit voltage V1 does not exceed the withstand voltage of the internal circuit.

The DA converter 51 converts the digital voltage control signal Vs1 from the signal processing circuit 3 into an analog voltage control signal Vs2, and outputs the analog voltage control signal Vs2. The voltage control signal Vs2 is input to a non-inverting terminal of the amplifier Q5, and input to an inverting terminal of a comparator Q8 of the comparator circuit 7 to be described later.

The resistor R10 and the resistor R11 are connected in series between an output terminal of the amplifier Q5 and the node N22. An inverting terminal of the amplifier Q5 is connected between the resistor R10 and the resistor R11. This causes the amplifier Q5 to perform negative feedback amplification on the voltage control signal Vs2. A voltage output from the amplifier Q5 is referred to and illustrated as the reference voltage signal Vref. The reference voltage signal Vref is input to a non-inverting terminal of an amplifier Q6 of the shunt regulator circuit 6 to be described later.

In this example, the shunt regulator circuit 6 controls the circuit voltage V1 such that the voltage Vce of the transistor Q4 becomes a predetermined voltage (e.g., 2 V) and such that the circuit voltage V1 is smaller than the input voltage Vin by the voltage Vce of the transistor Q4. The shunt regulator circuit 6 includes a resistor R13, a resistor R14, the amplifier Q6, and a transistor Q7.

The resistor R13 and the resistor R14 are connected in series between the node N21 and the node N22. The resistor R13 is connected between the node N21 and an inverting terminal of the amplifier Q6. The resistor R14 is connected between the inverting terminal of the amplifier Q6 and the node N22. The circuit voltage V1 is divided by the resistor R13 and the resistor R14, input to the inverting terminal of the amplifier Q6, and input to the non-inverting terminal of the comparator Q8 of the comparator circuit 7.

The reference voltage signal Vref from the amplifier Q5 of the reference voltage processing circuit 5 is input to the non-inverting terminal of the amplifier Q6. The amplifier Q6 is an error amplifier that controls the circuit voltage V1 together with the transistor Q7 based on the difference (error) between a voltage obtained by dividing the circuit voltage V1 with the resistor R13 and the resistor R14 and the reference voltage signal Vref.

The transistor Q7 is a PNP bipolar transistor or a field effect transistor (FET), and is a PNP metal oxide semiconductor (MOS) FET in this example. A gate (G) of the transistor Q7 is connected to an output terminal of the amplifier Q6. A source (S) of the transistor Q7 is connected to the node N21. A drain (D) of the transistor Q7 is connected to the node N22. As a current flowing through the transistor Q7 (current between source and drain) decreases, the circuit voltage V1 increases. The current flowing through the transistor Q7 is controlled by a gate voltage of the transistor Q7. The amplifier Q6 controls the gate voltage of the transistor Q7. The reference voltage signal Vref, that is, the voltage control signal Vs2, the voltage control signal Vs1, the voltage signal Vd, and more specifically a voltage corresponding to the input voltage Vin are input to the non-inverting terminal of the amplifier Q6. For example, such circuit configuration causes the circuit voltage V1 to be controlled in accordance with the input voltage Vin.

More specifically, the circuit voltage V1 increases as the input voltage Vin increases. This results in an increase in power available to the internal circuit of the two-wire transmitter 100. For example, power determined by multiplying the circuit voltage V1 and the current signal Iout can be used. As described above, in the internal circuit, the circuit voltage V1 may be used after being converted by, for example, a DCDC converter (not illustrated) or the like. In that case, a current on an output side (secondary side) of the DCDC converter increases, and available power increases accordingly.

The comparator circuit 7 includes the comparator Q8. A voltage obtained by dividing the circuit voltage V1 with the resistor R13 and the resistor R14 is input to the non-inverting terminal of the comparator Q8. A voltage from the reference voltage processing circuit 5, in this example, the voltage control signal Vs2 is input to the inverting terminal of the comparator Q8. The reference voltage signal Vref may be input instead of the voltage control signal Vs2. The comparator Q8 compares these voltages, and outputs a voltage (e.g., low voltage or high voltage) in accordance with the comparison result. An output voltage of the comparator Q8 is input to the signal processing circuit 3.

When the circuit voltage V1 decreases, a voltage input to the non-inverting terminal of the comparator Q8 decreases, and the output voltage of the comparator Q8 is inverted. The signal processing circuit 3 detects a decrease (abnormality) of the circuit voltage V1 by detecting the inversion of the output voltage of the comparator Q8. For example, when the circuit voltage V1 continues to decrease, the internal circuit does not operate normally or stops. The signal processing circuit 3 executes processing for preliminarily addressing such a situation, for example, processing of holding a current value of the sensor signal S1.

Since the two-wire transmitter 100 includes the input voltage measuring circuit 2, the signal processing circuit 3 can also detect an abnormality of the input voltage Vin. For example, when the input voltage Vin is equal to or more than the withstand voltage of the constant current circuit 4, an abnormality of the input voltage Vin is detected. The two-wire transmitter 100 may notify (give alarm notification to) the external circuit 200 of a result of detecting an abnormality of the input voltage Vin. The current signal Iout may be used for this notification. When detecting that the current signal Iout is equal to or more than the withstand voltage value based on the voltage signal Vd, the signal processing circuit 3 controls the current signal Iout such that the current signal Iout has a magnitude outside a normal range of 4 to 20 mA (e.g., 3 mA). The current signal Iout outside the normal range is detected in the external circuit 200, and thereby a notification of an abnormality of the input voltage Vin is given. The time during which the abnormal input voltage Vin is applied to the constant current circuit 4 can be shortened by, for example, stopping the supply of a voltage and a current from the external circuit 200 to the two-wire transmitter 100 and decreasing the input voltage Vin such that the input voltage Vin is equal to or less than the withstand voltage value. Effects of, for example, reducing failure probability of the two-wire transmitter 100 can be obtained.

As described above, in the two-wire transmitter 100, as the input voltage Vin increases, the circuit voltage V1 of the internal circuit also increases. Therefore, power from the external circuit 200 can be effectively used. One example of calculation will be described.

Example of Calculation

The conditions are as follows.
(A) Minimum value of power supply voltage Eb=16.6 V, Maximum value=42 V
(B) Resistance value of resistor R1=250 Ω
(C) Resistance value of resistor R3=100 Ω
(D) Forward voltage of diode D1=1 V
(E) Ratio between resistance value of resistor R15 and resistance value of resistor R16=9:1 (Vdiv=Vin/10)

(F) Resistance value of resistor R10 is sufficiently smaller than resistance value of resistor R11 (gain of amplifier Q5=1)
(G) Ratio between resistance value of resistor R13 and resistance value of resistor R14=9:1 (V1=10 Vref)
(H) Voltage Vce for preventing saturation of transistor Q4=2 V The voltage Vce of the transistor Q4 is calculated by subtracting the circuit voltage V1 from the input voltage Vin as in Expression (1) below.

$$Vce = Vin - V1 \tag{1}$$

The input voltage Vin is calculated by using the voltage Vdiv as in Expression (2) below.

$$Vin = Vdiv \times 10 \tag{2}$$

Since the amplifier Q5 of the reference voltage processing circuit 5 has a gain of one, the voltage control signal Vs2 is equal to the reference voltage signal Vref. Furthermore, since the shunt regulator circuit 6 has a gain of 10, the circuit voltage V1 is calculated by using the voltage control signal Vs2 as in Expression (3) below.

$$V1 = Vs2 \times 10 \tag{3}$$

When Expressions (2) and (3) are substituted into Expression (1) and Vce=2 V is further substituted, the voltage control signal Vs2 is calculated as in Expression (4) below.

$$Vs2 = Vdiv - 0.2 \tag{4}$$

The signal processing circuit 3 generates and outputs the voltage control signal Vs1 so as to obtain the voltage control signal Vs2 of Expression (4) above. This allows the circuit voltage V1 to be increased in proportion to the input voltage Vin while maintaining Voltage Vce=2 V.

Available power is calculated. In a case of Power supply voltage Eb=16.6 V (minimum value) and Current signal Iout=4 mA, the input voltage Vin is calculated as in Expression (5) below. Eb min in the expression is the minimum value of the power supply voltage Eb. R1 and R3 are the resistance value of the resistor R1 and the resistance value of the resistor R3.

$$Vin = Eb\_min - Iout \times (R1 + R3) - 1 \text{ V} \tag{5}$$

When a numerical value indicated in the above-described condition is substituted into Expression (5) above, the input voltage Vin is 14.2 V. The circuit voltage V1 is controlled to 12.2 V. The available power at this time is 48.8 mW (=V1×Iout). The same applies to the technique of JP 2012-99088 A.

In contrast, in a case of Power supply voltage Eb=42 V (maximum value) and Current signal Iout=4 mA, the input voltage Vin is calculated to 39.6 V by Expression (5) above. The circuit voltage V1 is controlled to 37.6 V. The available power is 150.4 mW (=V1×Iout). The available power increases. Since the circuit voltage V1 does not change even when the power supply voltage Eb increases in the technique of JP 2012-99088 A, the available power remains 48.8 mW. The two-wire transmitter 100 according to the embodiment can almost triple the available power as compared with that according to the technique of JP 2012-99088 A.

When similar calculation is performed for Current signal Iout=20 mA, the power available at the time when the power supply voltage Eb has the minimum value is 172 mW in both the two-wire transmitter 100 according to the embodiment and the technique of JP 2012-99088 A. In contrast, the power available at the time when the power supply voltage Eb has the maximum value is 680 mW in the two-wire transmitter 100 according to the embodiment, and remains 172 mW in the technique of JP 2012-99088 A. The two-wire transmitter 100 according to the embodiment can almost quadruple the available power as compared with that according to the technique of JP 2012-99088 A.

The circuit configuration of the two-wire transmitter 100 is not limited to the configuration in FIG. 2 described above. Some variations will be described.

First Variation

Figure 3:
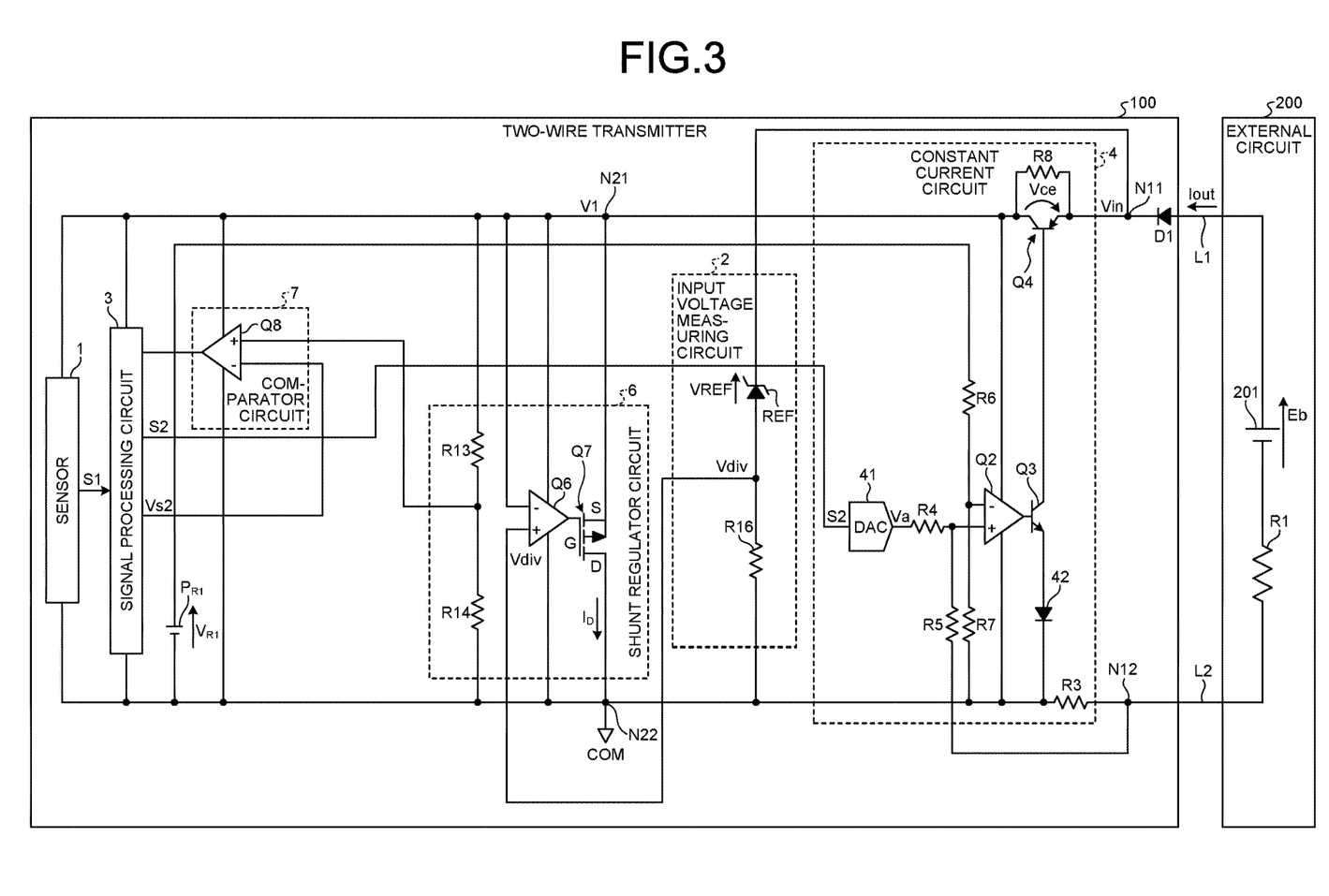
FIG. 3 illustrates a variation of the circuit configuration.

FIG. 3 illustrates a variation of the circuit configuration. The two-wire transmitter 100 in FIG. 3 is different from that in the configuration in FIG. 2 described above particularly in that the reference voltage processing circuit 5 is not included, the input voltage measuring circuit 2 includes a reference voltage source REF instead of the resistor R15 while not including the AD converter 21, the voltage Vdiv from the input voltage measuring circuit 2 is input to the non-inverting terminal of the amplifier Q6, and the inverting terminal of the amplifier Q6 is connected to the node N21.

The voltage of the reference voltage source REF is referred to and illustrated as a reference voltage VREF. In this example, the reference voltage source REF is a Zener diode. The reference voltage VREF may be the same as the voltage Vce of the transistor Q4 described above. A voltage smaller than the input voltage Vin by the reference voltage VREF is generated as the voltage Vdiv. The voltage Vdiv is input to the non-inverting terminal of the amplifier Q6 of the shunt regulator circuit 6.

The amplifier Q6 of the shunt regulator circuit 6 controls the circuit voltage V1 such that the circuit voltage V1 becomes the voltage Vdiv. For example, when the reference voltage VREF is 2 V, the circuit voltage V1 can be increased in proportion to the input voltage Vin while the voltage Vce of the transistor Q4 is maintained at 2 V.

Note that, in the example in FIG. 3, the voltage control signal Vs2 is directly generated by the signal processing circuit 3. Note, however, that, similarly to FIG. 2 described above, the signal processing circuit 3 may generate the voltage control signal Vs1. The voltage control signal Vs1 may be converted into the voltage control signal Vs2 and input to the inverting terminal of the comparator Q8 of the comparator circuit 7 by providing a DA converter (corresponding to DA converter 51 in FIG. 2) between the signal processing circuit 3 and the comparator circuit 7.

According to the two-wire transmitter 100 in FIG. 3, it is unnecessary to control the shunt regulator circuit 6 with the signal processing circuit 3 via the reference voltage processing circuit 5 as described above with reference to FIGS. 1 and 2. Therefore, the reference voltage processing circuit 5 can be made unnecessary. Furthermore, the AD converter 21 (FIG. 2) of the input voltage measuring circuit 2 is also unnecessary. A component reduction effect is obtained.

Second Variation

Figure 4:
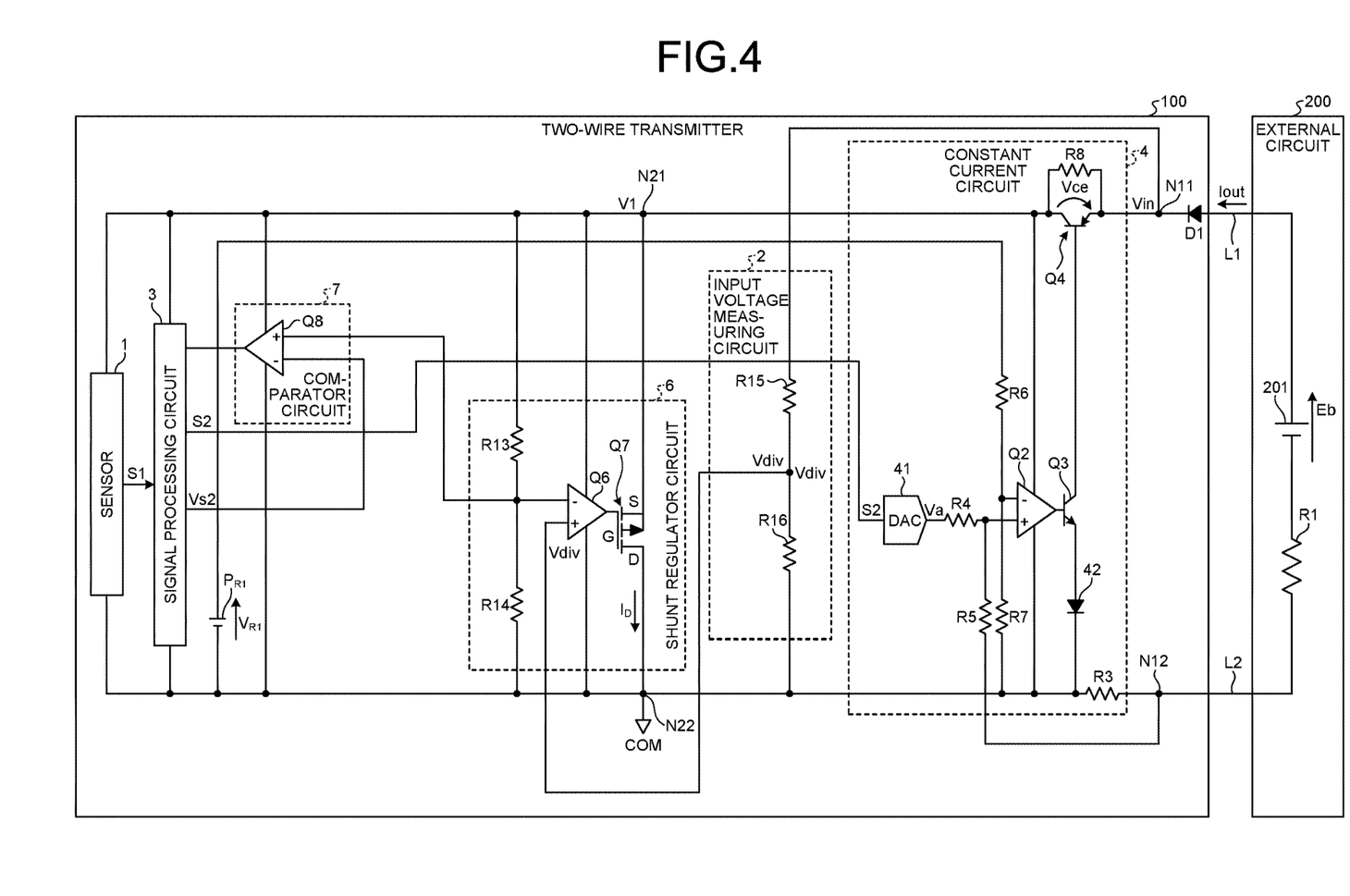
FIG. 4 illustrates a variation of the circuit configuration.

FIG. 4 illustrates a variation of the circuit configuration. The two-wire transmitter 100 in FIG. 4 is different from that in the configuration in FIG. 2 described above particularly in that the reference voltage processing circuit 5 is not included, the input voltage measuring circuit 2 does not include the AD converter 21, and the voltage Vdiv from the input voltage measuring circuit 2 is input to the non-inverting terminal of the amplifier Q6 of the shunt regulator circuit 6.

The circuit voltage V1 is controlled by changing a gain of the input voltage measuring circuit 2, that is, the ratio between a resistance value of the resistor R15 and a resistance value of the resistor R16 and a gain of the shunt regulator circuit 6, that is, the ratio between a resistance value of the resistor R13 and a resistance value of the resistor R14.

For example, when the input voltage Vin is 10 V, the ratio between the resistance value of the resistor R15 and the resistance value of the resistor R16 is 9:1, and the ratio between the resistance value of the resistor R13 and the resistance value of the resistor R14 of the shunt regulator circuit 6 is 7:1, the voltage Vdiv, the circuit voltage V1, and the voltage Vce are calculated as Expressions (6) to (8) below.

$$Vdiv = Vin \times \tfrac{1}{10} = 1 \text{ V} \tag{6}$$

$$V1 = Vdiv \times 8 = 8 \text{ V} \tag{7}$$

$$Vce = Vin - V1 = 2 \text{ V} \tag{8}$$

The voltage Vce of the transistor Q4 becomes 2 V, and the circuit voltage V1 is controlled to a voltage smaller than the input voltage Vin by 2 V. The configuration of the two-wire transmitter 100 in FIG. 4 can reduce an input voltage of the amplifier Q6 of the shunt regulator circuit 6 as compared with that in the configuration in FIG. 3 described above. Accordingly, a component with a low withstand voltage can be used.

Other Variations

Each signal may be generated not by the above-described embodiment but by various approaches. For example, in the above-described embodiment, a case where the DA converter 41 and the DA converter 51 are used to generate the voltage signal Va and the voltage control signal Vs2 has been described in an example. Note, however, that, for example, pulse width modulation (PWM) control and low pass filter (LPF) as disclosed in JP 2012-99088 A may be used instead of the DA converter 41 and the DA converter 51, or various other known approaches may be used. The functions of the DA converter 41 and the DA converter 51 may be implemented in the signal processing circuit 3.

The above-described techniques are specified as follows, for example. One of the disclosed techniques is the two-wire transmitter 100. As described with reference to FIG. 1 and the like, the two-wire transmitter 100 is connected to the external circuit 200 via the two transmission lines L1 and L2, and operates by using the input voltage Vin and the current signal Iout supplied from the external circuit 200. The two-wire transmitter 100 includes the constant current circuit 4 and the shunt regulator circuit 6. The constant current circuit 4 controls the current signal Iout in accordance with a detection result from the sensor 1. The shunt regulator circuit 6 controls the circuit voltage V1 in accordance with the input voltage Vin. The shunt regulator circuit 6 controls the circuit voltage V1 such that the circuit voltage V1 increases as the input voltage Vin increases.

According to the above-described two-wire transmitter 100, the circuit voltage V1 increases as the input voltage Vin increases. As the circuit voltage V1 increases, power available to the internal circuit also increases accordingly. Therefore, power from the external circuit 200 can be effectively used.

As described with reference to FIGS. 1, 2, 4, and the like, the two-wire transmitter 100 may include the input voltage measuring circuit 2 that measures a voltage corresponding to the input voltage Vin, and the shunt regulator circuit 6 may control the circuit voltage V1 based on a voltage measured by the input voltage measuring circuit 2. For example, the circuit voltage V1 can be controlled by using a voltage measurement result from the input voltage measuring circuit 2 as described above.

As described with reference to FIG. 2 and the like, the constant current circuit 4 may include the transistor Q4 connected between the transmission line L1 and the shunt regulator circuit 6 such that a current between the collector and the emitter flows from the transmission line L1 toward the shunt regulator circuit 6, and the shunt regulator circuit 6 may control the circuit voltage V1 such that the voltage Vce between the collector and the emitter of the transistor Q4 of the constant current circuit 4 becomes a predetermined voltage and such that the circuit voltage V1 is smaller than the input voltage Vin by the voltage Vce between the collector and the emitter of the transistor Q4. This allows control of the circuit voltage V1 while inhibiting saturation of the transistor Q4.

As described with reference to FIG. 3 and the like, the input voltage measuring circuit 2 may generate the voltage Vdiv smaller than the input voltage Vin by a predetermined voltage (e.g., reference voltage VREF of reference voltage source REF), and the shunt regulator circuit 6 may control the circuit voltage V1 such that the circuit voltage V1 becomes the voltage Vdiv generated by the input voltage measuring circuit 2. This can eliminate the need for the reference voltage processing circuit 5 that supplies the reference voltage signal Vref to the shunt regulator circuit 6, for example. Furthermore, the AD converter 21 of the input voltage measuring circuit 2 is also unnecessary. A component reduction effect is obtained. Note that, in FIG. 4, the reference voltage processing circuit 5 and the AD converter 21 are unnecessary, and a component reduction effect is obtained.

What is claimed is:

1. A two-wire transmitter that is connected to an external circuit via two transmission lines and that operates by using an input voltage and a current signal supplied from the external circuit, the two-wire transmitter comprising:
    a constant current circuit that controls the current signal in accordance with a detection result from a sensor; and
    a shunt regulator circuit that controls a circuit voltage in accordance with the input voltage,
    wherein the shunt regulator circuit controls the circuit voltage such that the circuit voltage increases as the input voltage increases,
    the constant current circuit includes a transistor connected between one of the transmission lines and the shunt regulator circuit such that a current flowing through the transistor flows from the one of the transmission lines toward the shunt regulator circuit,
    the shunt regulator circuit controls the circuit voltage such that a voltage between terminals of the transistor in the constant current circuit becomes a predetermined voltage and such that the circuit voltage is smaller than the input voltage by the predetermined voltage, and
    the predetermined voltage is a voltage at which the transistor is not saturated.

2. The two-wire transmitter according to claim 1, further comprising
    an input voltage measuring circuit that measures a voltage in accordance with the input voltage,
    wherein the shunt regulator circuit controls the circuit voltage based on a voltage measured by the input voltage measuring circuit.

3. The two-wire transmitter according to claim 1,
    wherein the input voltage measuring circuit generates a voltage smaller than the input voltage by the predetermined voltage, and the shunt regulator circuit controls the circuit voltage such that the circuit voltage becomes the voltage generated by the input voltage measuring circuit.

4. The two-wire transmitter according to claim 2, further comprising a signal processing circuit that detects an abnormality in the input voltage based on a voltage measured by the input voltage measuring circuit.

* * * * *